United States Patent
Cho et al.

(10) Patent No.: US 8,320,870 B2
(45) Date of Patent: Nov. 27, 2012

(54) SPORT EVENT TRANSDUCER

(76) Inventors: Jeffrey C. Cho, Northborough, MA (US); Bruce J. Barker, Franklin, MA (US)

(*) Notice: Subject to any disclaimer, the term of this patent is extended or adjusted under 35 U.S.C. 154(b) by 143 days.

(21) Appl. No.: 12/896,989

(22) Filed: Oct. 4, 2010

(65) Prior Publication Data

US 2012/0034889 A1 Feb. 9, 2012

Related U.S. Application Data

(63) Continuation-in-part of application No. 12/852,361, filed on Aug. 6, 2010, now abandoned.

(51) Int. Cl.
H04B 1/06 (2006.01)
(52) U.S. Cl. .................. 455/344; 455/3.06
(58) Field of Classification Search .............. 455/556.1, 455/557, 344, 66.1, 419, 420, 3.06, 90.3
See application file for complete search history.

(56) References Cited

U.S. PATENT DOCUMENTS

| | | | |
|---|---|---|---|
| 4,045,788 A | 8/1977 | Castelli et al. | |
| 6,302,570 B1 | 10/2001 | Petell et al. | |
| 6,490,402 B1 | 12/2002 | Ota | |
| 6,511,198 B1 | 1/2003 | Erickson | |
| 6,733,150 B1 | 5/2004 | Hanley | |
| 6,834,395 B2 | 12/2004 | Fuentes | |
| 6,895,261 B1 | 5/2005 | Palamides | |
| 7,024,180 B2 | 4/2006 | Waters et al. | |
| 7,052,154 B2 | 5/2006 | Vanderschuit | |
| 7,192,152 B1 | 3/2007 | Hesse | |
| 7,209,958 B2 | 4/2007 | Crookham et al. | |
| 7,259,691 B2 | 8/2007 | Kimbrough, Jr. | |
| 7,311,411 B2 | 12/2007 | Vanderschuit | |
| 7,506,992 B2 | 3/2009 | Carter | |
| 2003/0151910 A1 | 8/2003 | Marston | |
| 2003/0184575 A1 | 10/2003 | Reho et al. | |
| 2005/0137958 A1 | 6/2005 | Huber et al. | |
| 2005/0138106 A1 | 6/2005 | Crookham et al. | |
| 2006/0007059 A1 | 1/2006 | Bell | |
| 2007/0021057 A1 | 1/2007 | Arseneau et al. | |
| 2008/0070505 A1 | 3/2008 | Faltman | |
| 2008/0189215 A1 | 8/2008 | Travez et al. | |
| 2008/0272934 A1 | 11/2008 | Wang et al. | |
| 2009/0014536 A1* | 1/2009 | Gelbman | 235/492 |

(Continued)

OTHER PUBLICATIONS

Radiotext Plus (RTplus) Specification, Version 1.0, RDS Forum 2005, pp. 1-8.*

(Continued)

*Primary Examiner* — Lewis West
(74) *Attorney, Agent, or Firm* — Bruce Barker

(57) ABSTRACT

A sport event transducer having an output element that can emit a perceivable output in response to an event that relates to a sport team, such as for example by emitting an audio-visual output when a particular football team scores a touchdown. The transducer can be removable attached to a sport garment such as a cap or jersey, or can be an integral part of the garment. A transmission system remotely controls such transducers in response to sport team events by broadcasting an RF signal carrying team event messages, such as for example by transmitting an FM radio-data broadcast that carries a team event message embedded in the FM signal as RDS data. The sport event transducer receives and decodes such RF broadcast signals. If the transducer receives a team event message that relates to the transducer's affiliated team, the transducer's output element emits an audio and/or visual output signal in response to the message.

15 Claims, 7 Drawing Sheets

U.S. PATENT DOCUMENTS

2009/0241243 A1* 10/2009 Ritter ........................... 2/209.13
2009/0264149 A1* 10/2009 Miller et al. ............... 455/552.1
2010/0026809 A1 2/2010 Curry

OTHER PUBLICATIONS http:/www.crunchwear.com/lumalive-brings-fabrics-alive/; printed Sep. 9, 2010.

http://en.wikipedia.org/wiki/lumalive; printed Sep. 9, 2010.
D. Kopitz, "RDS: The Radio Data Systems," Artech House (1999). Excerpts, including table of contents, section 1.8, and chapter 9.
S. Wright, "The Broadcaster's Guide to RDS," Focal Press (1997). Excerpts, including table of contents, and chapter 16.

* cited by examiner

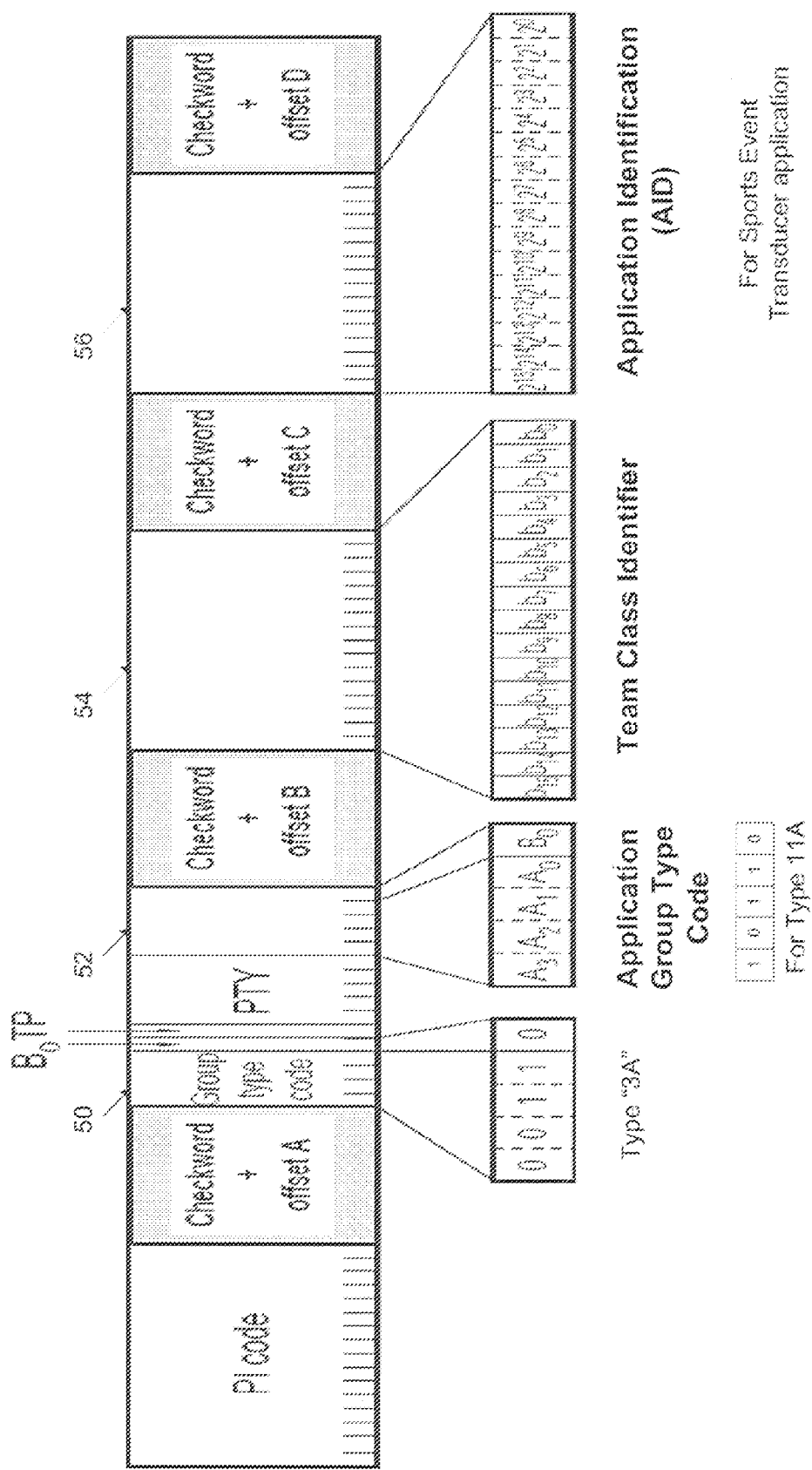
Fig. 5 Type "3A" Group (00110) Example RDS Message

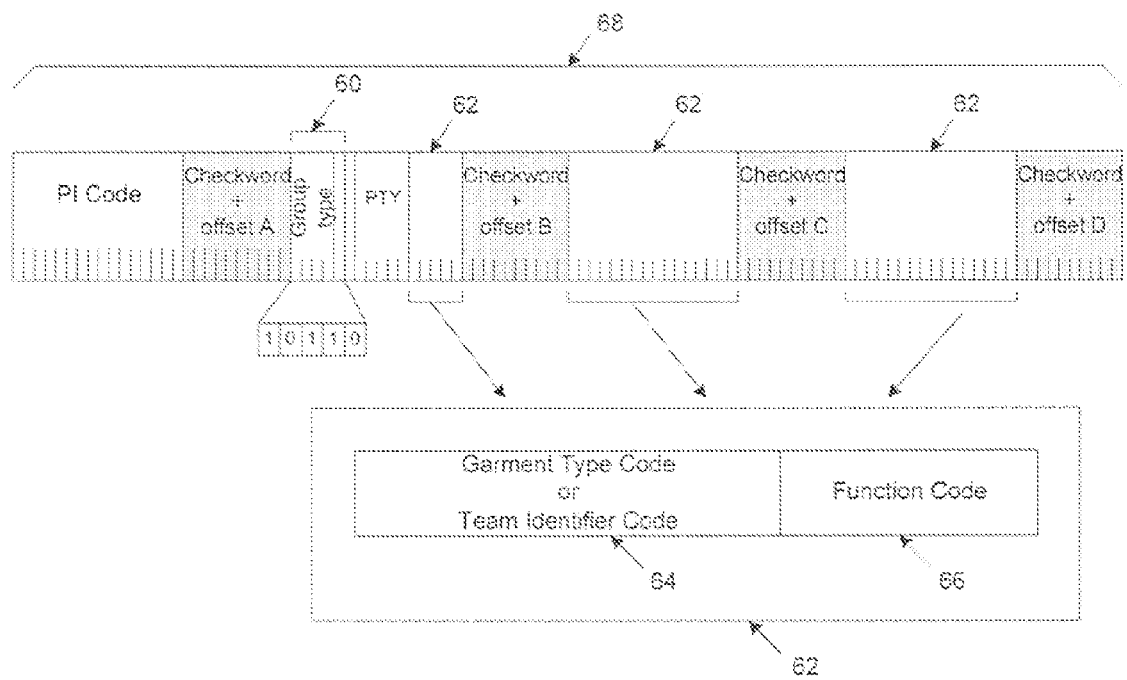
FIG. 6    Type 11A Group (10110) Example RDS Message

SPORT EVENT TRANSDUCER

This is a continuation-in-part of application Ser. No. 12/852,361 filed on Aug. 6, 2010 now abandoned entitled "Sport Event Transducer."

FIELD OF THE INVENTION

The present invention relates generally to sport team merchandise and in particular to sport garments such as caps and jerseys that bear team logos or other graphic images relating to a sport team, such as popular national sports teams as well as local or regional sports teams and the like. Such merchandise is typically worn or carried by fans to show their loyalty to and interest in a particular team or player.

BACKGROUND OF THE INVENTION

Many sports fans wear caps or other items that bear the logos or other indicia of a team or player they support. When attending games, some fans carry posters, signs or flags bearing pictures or text for display to others in the audience or to television cameras that broadcast the event. A team logo or other indicia is often printed on these items. However, U.S. Pat. No. 6,511,198 describes a jersey having a fabric made of light emitting polymers for electronically displaying a team logo or other sports related message. The message can be modified to remain up to date. For example, the patent says that the "user may alter the display to read 'New York Yankees—World Champions 1999.'"

SUMMARY OF THE INVENTION

The invention relates generally to a Sport Event Transducer and a method of operating the transducer so that it emits a perceivable output in response to an event relating to a sport team, such as for example, by emitting an audio-visual output when a particular football team scores a touchdown. In one embodiment, the Sport Event Transducer receives and decodes a signal that carries team event messages. If a team event message relates to a team or player affiliated with that transducer, the transducer emits an audio and/or visual output signal in response to the message.

BRIEF DESCRIPTION OF THE DRAWINGS

FIG. 5 is a diagram of a type "3A" group for notifying Sport Event Transducers of a selected group type for use in carrying team event messages.

FIG. 6 is a diagram of an RDS data group of type 11A that carries a team event message.

DETAILED DESCRIPTION OF AN EMBODIMENT

Figure 1:
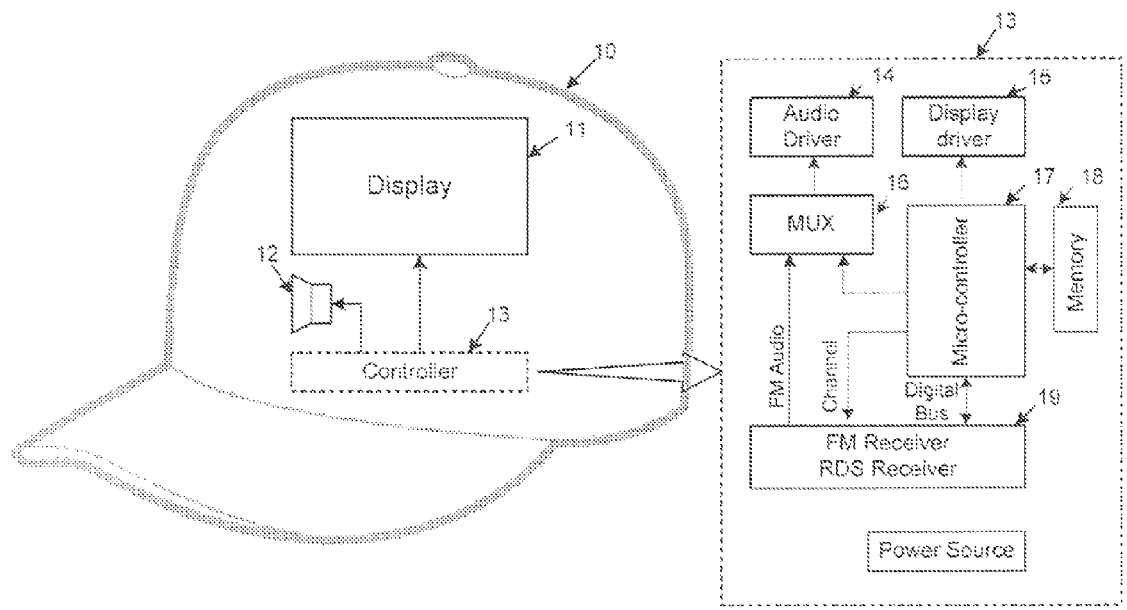
FIG. 1 illustrates a garment having output elements and an intelligent controller with an FM radio receiver.

FIG. 1 depicts a Sport Event Transducer in the form of a garment 10 that includes one or more display elements 11 and one or more speaker elements 12, as well as a controller 13 for controlling the output of these elements. The garment includes a portable power source, such as a lithium-ion battery, that has the capacity to supply power to the electronics, the display and the speaker elements. The power source supplies the output elements with sufficient energy that they can be seen and heard in either an indoor environment or in an outdoor setting such as a sports stadium where the ambient light and sound can be substantially greater.

Garment 10 will typically bear a logo or other marking or indicia of a sport team or player. (To avoid the need to repeatedly use the phrase "sport team or player," the word "team" will be used herein when referring to a team or player that is affiliated with a Sport Event Transducer). Regardless of whether the garment bears such markings of a particular team, the garment includes a team identifier for electronically identifying a sport team associated with the garment. For example, the controller 13 includes memory 18 that can be loaded with an identification code that corresponds to a particular sport team. The team identifier can be in the form of a predetermined memory location or register that stores the identification code. It can also be embedded in processor instructions or micro-code for the garment's controller. Any type of team identifier can be used, as long as it can specify the garment's team affiliation to the controller.

A display element can be a single light emitting diode ("LED") or multiple LEDs. Alternatively, it can be implemented using any material that glows or emits light under electronic control. For example, in one embodiment, a garment that is associated with a particular sport team is partly made of light emitting polymers such as described in U.S. Pat. No. 6,511,198, incorporated herein by reference. Similarly, a garment can be made using a light emitting weave as described in U.S. Pat. No. 6,490,402, also incorporated herein by reference.

A speaker element 12 can be any known acoustic transducer for emitting a sound signal in response to a signal, such as known piezoelectric transducers or electromagnetic speakers.

The main controller 13 includes a micro-controller 17 with a related memory 18 for controlling the display element 11 and speaker element 12. The micro-controller 17 supplies control signals to a display driver 15 to thereby turn the display element on and off, as well as to control the intensity and/or the color of the element. In one embodiment, the entire display element 11 operates as a single pixel. In this embodiment, all light emitting units within the display element operate together, turning on and off at the same time so as to behave as a single light source. However, in other embodiments, multiple light emitting units within the display element operate as individual pixels that can be controlled independently of each other.

The micro-controller 17 also supplies a control signal to a multiplexer 16 for selecting an input to an audio driver 14 that controls the sound that is output by speaker element 12. For example, the micro-controller can retrieve from memory 18 a selected sound pattern and forward it to the audio driver via multiplexer 16 for reproduction by the speaker element 12. Memory 18 can be loaded with a plurality of stored sound patterns, such as a pattern that emits a siren sound, a sound of an explosion, or any of a variety of other stored sound patterns. Those skilled in the art will understand that such patterns can be stored in a memory and can be compressed to reduce the amount of memory required to store the pattern. Alternatively, the controller can direct multiplexer 16 to drive speaker 12 with the audio content of a radio signal received by a receiver 19 within the controller 13.

In one example, the micro-controller includes a module that causes the output elements to emit a random sequence of popping sounds and light flashes. More specifically, when a transducer receives a command to implement this module, it's controller waits a random period of time before driving the speaker 12 with a pop or crack sound, and driving the display with a quick bright flash. The controller repeats this output several times, each time separated by a random delay. The controller thereby drives the speaker and display with a sequence of randomly separated pulses. Thus, if this module is executed by a group of sports transducers that are in the same vicinity, they will collectively emit an audio/visual show similar to that of fireworks.

As shown in FIG. 1, the controller 13 also includes a receiver 19 for receiving a broadcast RF signal that contains commands for controlling the display element 11 and/or speaker element 12. Preferably, the receiver is designed to receive RF signals that are transmitted over long distances that span a wide area (such as over an entire metropolitan area), and can penetrate buildings and other structures to thereby reach many garments for a popular sport team in the area covered by the RF transmission. For example, the receiver can be compatible with commercial transmitters for FM radio, AM radio, Digital Radio, terrestrial television or other signal formats used to reach audiences over a wide area. In other embodiments, any suitable technique for wireless communication can be used.

In the embodiment shown in FIG. 1, the receiver 19 is designed to receive and demodulate FM radio transmissions from a commercial radio station, which typically span many square miles and can penetrate homes and other buildings. More specifically, the receiver is compatible with FM station radio-data equipment that complies with the Radio Broadcast Data System ("RBDS"). The National Radio Systems Committee ("NRSC") has defined a standard for RBDS that specifies how to embed data in FM radio transmissions to thereby communicate the data (herein "RDS data") using the same radio signals that carry music or other sound content.

Figure 2:
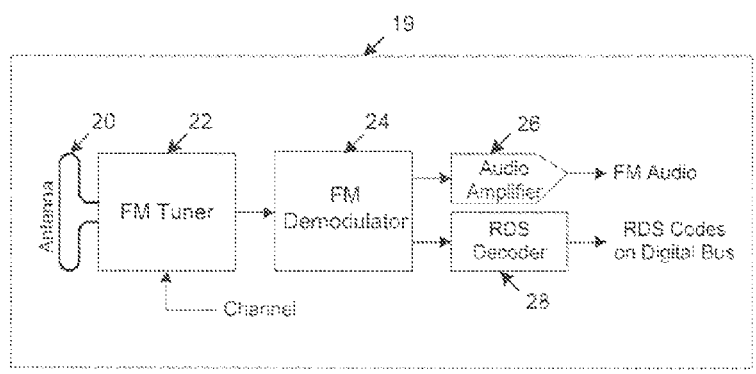
FIG. 2 is a block diagram of a radio-data receiver/decoder.

Referring to FIG. 2, the receiver 19 includes an antenna 20 and an FM tuner 22 for receiving the RF signal and isolating a particular FM channel. In the example shown, the tuner isolates an FM channel that is selected by micro-controller 17, as indicated by the "channel" signal from the microcontroller.

An FM demodulator 24 demodulates the selected channel to extract the audio content for the FM channel that is then provided to an audio decoder/amplifier 26. The FM demodulator 24 also extracts from the FM channel a subcarrier signal that is encoded with the RDS data and supplies that subcarrier signal to an RDS decoder 28.

A general example of an RDS decoder 28 is shown in the current RBDS standard, wherein the standard depicts what it calls a "typical" decoder for extracting RDS data from such a subcarrier signal. However, any RDS decoder that is compatible with a corresponding FM radio-data transmitter can be used. For example, several companies currently supply IC chips for use in making RDS compatible FM receivers and RDS decoders, including chips from ST Microelectronics N.V, Silicon Laboratories Inc., and NXP Semiconductors Co.

The raw RDS data extracted by the RDS decoder is provided to the micro-controller 17, for example via a digital bus. The controller 17 then extracts from the raw RDS data a message that corresponds to an event relating to a sports team, herein a "team event message." The controller 17 includes a decoder module that determines whether the received team event message relates to the team associated with that garment, as specified by the garment's team identifier. If so, a message interpretation module within the controller causes the garment's display element 11 and/or its speaker elements 12 to emit a corresponding output based upon the content of the team message. For example, in one application of the invention, a plurality of garments each bear the logo for a popular NFL team, herein "Team A." When Team A scores a touchdown during a game, a broadcast transmission system broadcasts an FM radio-data signal that contains an embedded team event message that notifies all Team A garments within the vicinity that a touchdown has occurred. Each of the garments that receive the transmission extract the team event message from the radio broadcast. For those garments affiliated with Team A, the garments' controllers cause the garments' display elements and/or their speaker elements to emit a corresponding output in celebration of the touchdown.

Figure 3:
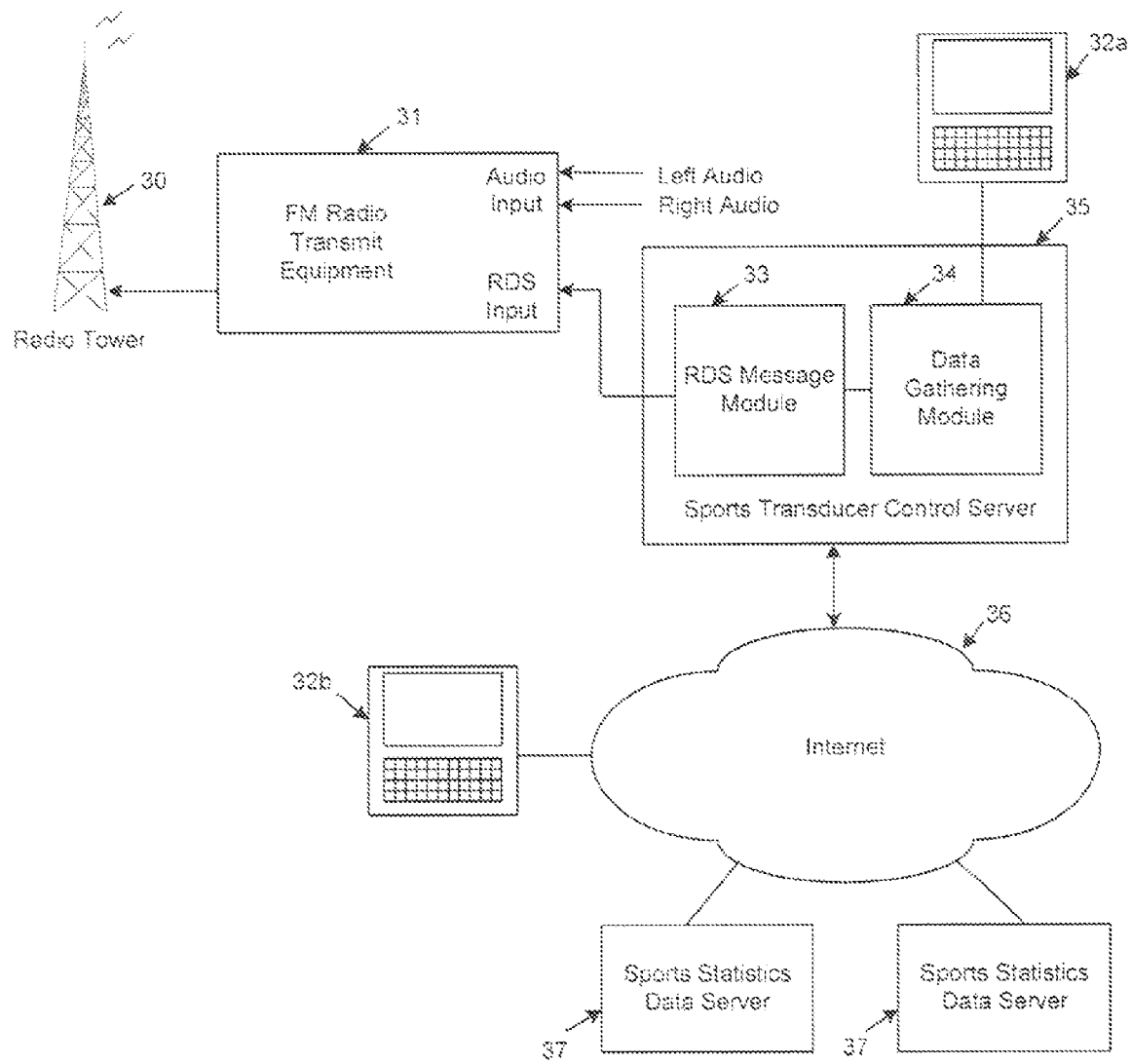
FIG. 3 is a diagram of a transmission system for preparing and transmitting RDS team event messages.

Referring to FIG. 3, a transmission system transmits team event messages over a wide area (such as an area that encompasses the geographic market for a popular sport team) using a signal format that can penetrate homes and other buildings with sufficient strength to permit them to be decoded by Sport Event Transducers within those structures. In the example shown, the system includes an FM radio station antenna 30 that is coupled to the transmitter of conventional FM station radio-data equipment 31 that complies with the RDBS standard. Those skilled in the art know that the standard for RBDS specifies in detail the format for RDS data, and that it shows a general technique for encoding and modulating an FM signal so that the signal carries a pair of audio signals as well as an RDS data stream. Any technique and corresponding circuitry/software can be used to prepare such FM radio-data signals that are compatible with the receiver 19 of Sport Event Transducers.

The system of FIG. 3 includes a sport transducer control server 35 for supplying RDS data to the FM station system 31. As explained in greater detail below, the server 35 prepares the RDS data for transmission by the radio station equipment 31 and its antenna 30.

The sport transducer control server 35 includes a data-gathering module 34 for obtaining real-time information concerning the status of certain sporting events. For example, in one embodiment, the module includes a user console 32(*a*) for accepting user input of sports information. In this example, a user observes a sporting event (live or remotely) and enters selected status information into the console as events occur, such as when a football team scores a touchdown. As explained below, this information can be used to trigger the broadcast of a corresponding team event message. Furthermore, the user of console 32(*a*) can also issue a team event message that is independent of any particular scoring event. For example, the user can issue a team event message directing all team garments and other sports transducers to light up or issue a sound blast at any moment that the user deems appropriate, such as at a moment during a game that the user considers critical or exciting.

In another embodiment, the system includes a remote user console 32(*b*) that operates in essentially the same way as local console 32(*a*), except that it supplies its input to the data-gathering module 34 from a remote location. In such embodiments, the transmissions between the remote console and data gathering module are secured to prevent unauthorized persons from triggering team event messages, for example using known cryptographic techniques to identify authorized users, or by otherwise encrypting communications between the remote console and the control server.

In other embodiments, the module 34 automatically gathers sporting information from one or more remote servers, for example via the Internet. In the example shown, there are several sports statistics servers 37 accessible via the Internet that provide real-time sports information, such as current scores of baseball games and other real-time game statistics. The gathering module receives such information from one or more such servers, and supplies it to a messaging module 33.

The messaging module 33 detects from this input the occurrence of certain predefined events and, in response, instructs the system 31 to broadcast a corresponding team event message to Sport Event Transducers of a specified type, thereby simultaneously notifying a plurality of Sport Event Transducers of the event in real-time. Returning to the example above, if Team A scores a touchdown, the data-gathering module 34 quickly learns of that event and promptly notifies the messaging module 33. In response, the messaging module prepares a corresponding team event message and forwards the message to the FM radio system 31 for transmission in a format that is compliant with RBDS.

The RBDS standard allows FM radio stations to transmit data on an FM channel by encoding the data into a subcarrier signal that is injected into an FM audio signal to thereby form a composite FM signal. The standard specifies how to encode several predefined types of data into the composite signal. For example, it defines how to encode data that tunes radio receivers, and data called "radio text" that is displayed by the receiver, such as the name of a song currently playing on the FM channel.

The RDBS standard also describes a protocol for encoding data for undefined applications called "Open Data Applications." The standard allows for over 65,000 open data applications, each of which can be assigned a unique sixteen-bit identification code called the "Application Identifier" or "AID." Such AID numbers are assigned by an RDS Registration Office in response to requests from those wishing to transmit data for an application that is not pre-defined in the RBDS standard.

In one embodiment of the present invention, a user obtains from an RDS Registration Office, an AID code for the sports event transducer application. This AID code is then used to identify team event messages broadcast in accordance with the RDS system as explained below.

Figure 4A:
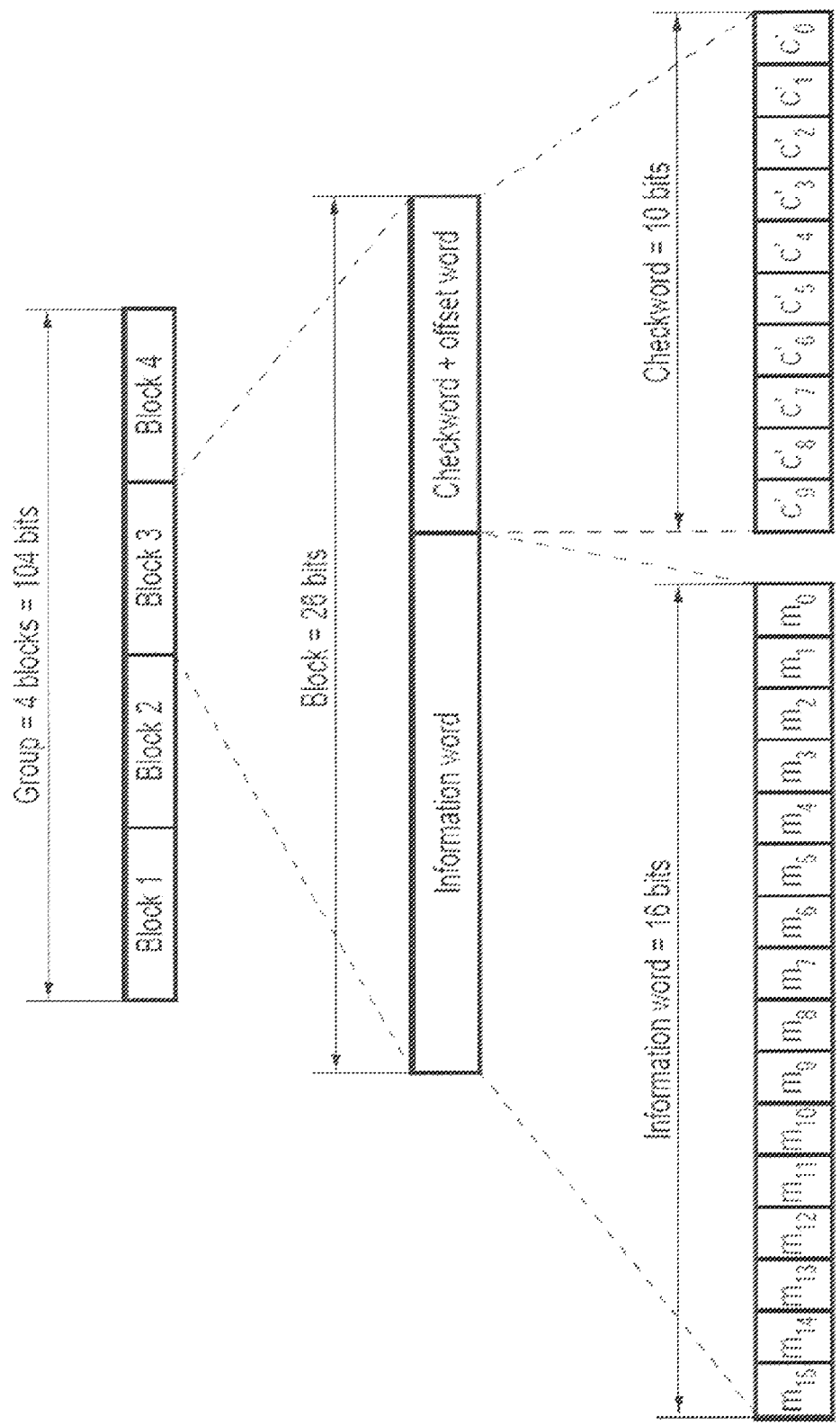
FIGS. 4a and 4b are diagrams of the structure of an RDS data group specified in the RBDS standard.
Figure 4B:
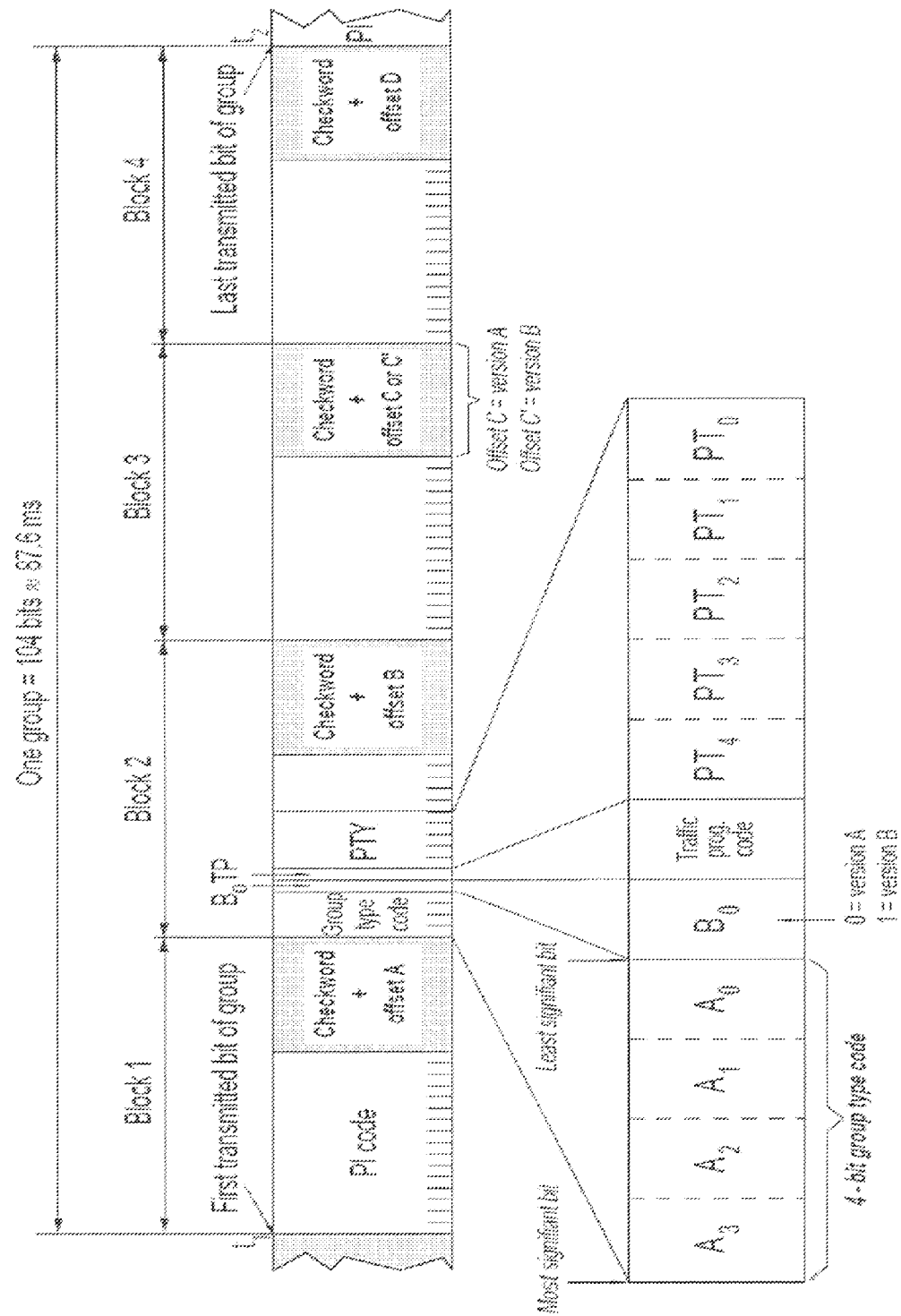

RDS data is formatted in "groups" of 104 bits that are arranged in four "blocks" of twenty-six bits each, as shown in FIGS. 4a and 4b (reproduced from the industry standard). The second block of each group includes a five-bit "group type" code that specifies the group's purpose, as shown in table 3 of the RBDS specification. For example, the group type "0A" is used to transmit data for tuning FM receivers, while group type "2A" is used for transmitting radio text. The RBDS specification allocates only nineteen group types for use by Open Data Applications ("ODAs"). Since there are far more than nineteen possible ODAs, the ODAs must share the nineteen ODA group types.

The messaging module 33 uses ODA group types for carrying team event messages as follows. First, the messaging module 33 (and/or the transmission system 31) selects one of the available ODA group types. It then notifies all sports event transducers in the area of the selection by broadcasting a type "3A" group as shown in FIG. 5.

Field 56 of the type 3A group contains the AID that is registered for the Sport Event Transducer Application, thereby indicating to all receivers that this type 3A group is for the Sport Event Transducer Application. Field 52 provides an Application Group Type Code that identifies the ODA group type that was selected for the Sport Event Transducer Application. In this example, the Application Group Type Code equals 10110, thereby indicating that group type 11A was chosen. Thus, the type 3A group shown in FIG. 5 notifies all receivers that ODA group type 11A will carry data for the Sport Event Transducer Application.

The type 3A group also includes a field 54 can carry other information for sports event transducers. For example, in the embodiment shown, the field 54 contains a team class identifier that identifies a team or a group of teams to whom this type 3A group is directed. For example, if a given radio station is using type 11A groups to carry team event messages for all of the major teams in the area around Boston, Mass., then field 54 contains a team class identifier indicating this fact. Alternatively, if the radio station uses group type 11A only to carry messages for one team (such as the New England Patriots), then the patriots' team identifier would be placed in field 54. In this manner, a radio station can assign one or more teams to a selected ODA group.

Once the selected group type 11A has been broadcast to the sports event transducers in the region, message module 33 and transmitter 31 begin transmitting type 11A groups filled with team event messages. FIG. 6 depicts the format of a type 11A group that is encoded with a team event message.

Referring to FIG. 6, field 60 of the group contains the code for type 11A, i.e., 10110, and field 62 carries the team event message. In this example, the message is thirty-seven bits long because type 11A groups have a thirty-seven-bit payload. However, type B groups can also be used to carry messages, in which case the team event message would have only twenty-one bits.

The team event message 62 includes a team identifier code 64 (or "garment type code" for garment-type transducers) that identifies a particular team to which the message is directed, such as Team A in the above examples. The message also includes a function code 66 that specifies the type of event that has occurred (or a particular function to be performed), such as for example a code that indicates that a touchdown has occurred. As explained below, sports event transducers receive and decode such team event messages and perform a corresponding function or action.

Figure 7:
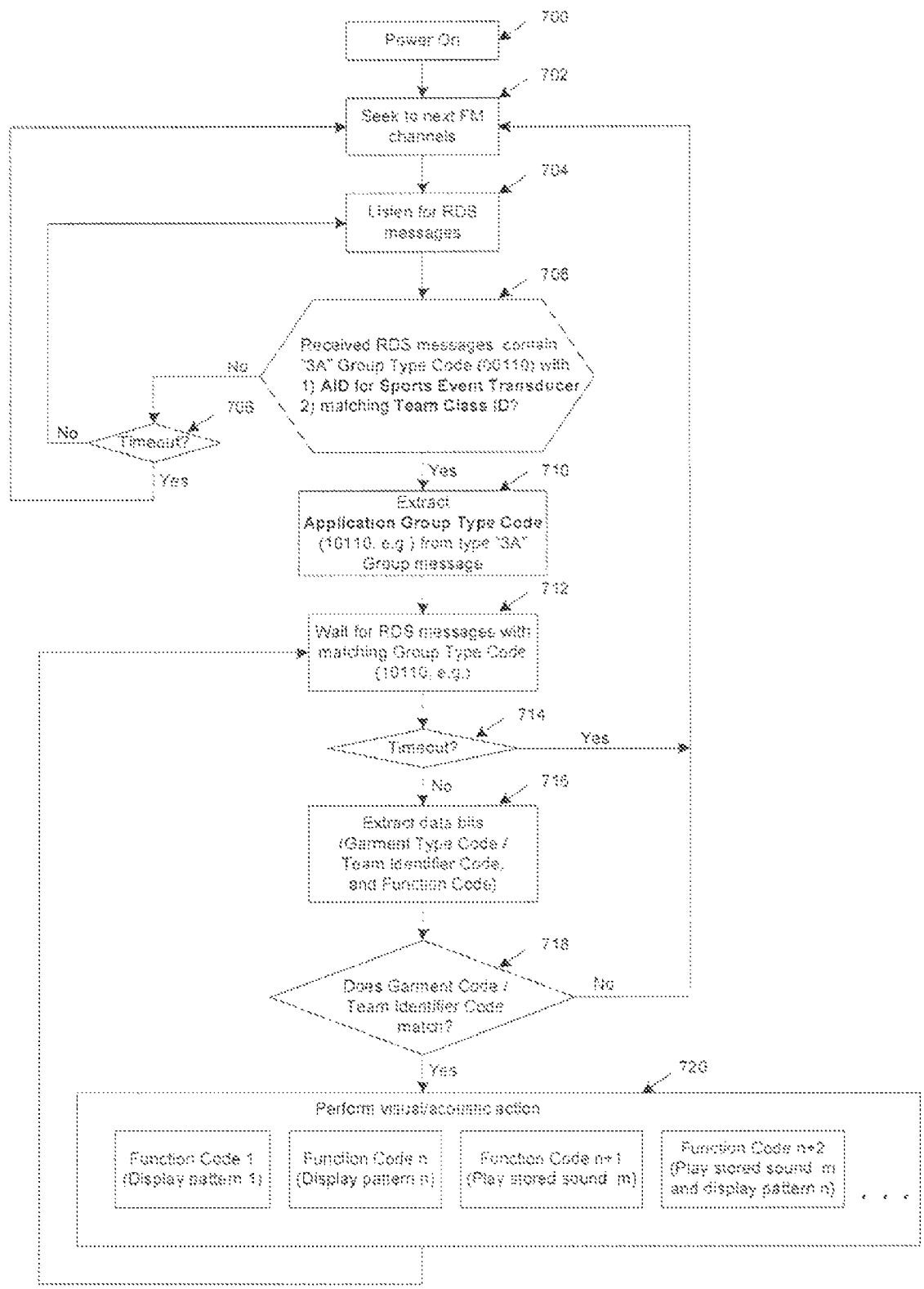
FIG. 7 is a flow chart of a controller module within a Sport Event Transducer for receiving and decoding an RDS team event message.

FIG. 7 depicts the general steps performed by the garment's micro-controller 17 for receiving and decoding such embedded RDS messages. Once the controller 13 is powered on (step 700), the FM receiver 19 and micro-controller 17 together begin scanning the FM radio channels (step 702) to locate one carrying team event messages. The micro-controller first directs the FM receiver 19 to tune to a particular channel. It then listens to the channel's signal to determine if it contains a type 3A RDS group for the Sports Event Transducer Application (steps 704-708).

Toward this end, it monitors the RDS stream for a group whose type field contains the code for type 3A (i.e., 00110) and whose AID field contains the code registered for the Sport Event Transducer application (Step 708). (If the team class option is used, the controller also determines if field 54 contains a team class code for that transducer (Step 708)). If no such group arrives within a specified period of time, the controller 17 directs the receiver 19 to scan to another channel (Steps 702-706). If the controller detects such a type 3A group, then it extracts the "Application Group Type Code" which species the group type chosen to carry data for this type of transducer, in this example group type 11A. (Step 710).

The controller then begins listening for a type 11A group (Step 712). If no type 11A group is received within a predetermined period of time, the controller returns to scanning the channels (Step 714, 702). However, if a type 11A group arrives, the controller extracts the team event message (Step 716) and compares the message's team identifier to the controller's team identifier (Step 718). If they match, the controller decodes the function code and directs the display element 11 and/or speaker element 12 to emit a corresponding output for that function (Step 720). It they do not match, the controller returns to scanning the FM channels. (Steps 718-702). In this example, the controller assumes that the selected FM channel uses type 11A groups to carry messages for only a single team and therefore returns to scanning channels if a message is received for some other team. However, in other embodiments wherein the channel uses type 11A groups to carry messages for multiple teams, the controller returns to listening for the next type 11A group (step 712) if the latest message is addressed to a different team.

It is possible that a garment that has been tuned to a particular FM channel and a particular selected RDS group type will move beyond the territory of the corresponding FM transmitter. If so, the controller 17 should resume scanning the FM channels to determine if a different channel is carrying team event messages in the new territory. For example, the controller 17 can return to the scanning step 702 if no team event message is received over a predetermined period of time, or it can periodically repeat the scanning step.

In some embodiments, the transmission system includes mechanisms for discouraging unauthorized Sport Event Transducers from responding to team event messages. For example, the RDS messaging module 33 within a transducer control server can encrypt each team event message so that only devices with a proper cryptographic key can decipher the team event messages. Furthermore, the messaging module 33 can occasionally emit decoy RDS groups that have the selected group type for a team event message, but whose data field 62 lacks a legitimate team event message, to thereby make it more difficult for unauthorized devices to know when legitimate team event messages are being issued.

The same architecture can be used to broadcast team event messages for all kinds of sporting events, wherein each Sport Event Transducer responds only to those broadcasts that relate to a particular team or player of interest. For example, the team identifiers can include a bit that indicates whether the team of interest is a local team (known only in the region of the FM transmitter, such as a little league team) or a more widely known team (such as an NFL team). This allows the system to efficiently distinguish between a very large number of teams throughout the country or world. Furthermore, in other embodiments, team event messages can be emitted for events other than sporting competitions. For example, during a parade, team event messages can be emitted to control garments worn by persons marching in the parade as well as persons watching the parade, to thereby generate an audio/visual demonstration.

Referring to FIG. 1, the micro-controller 17 and multiplexer 16 can also supply to the speaker 12 the audio content of the FM radio station. Furthermore, the garment can also include a port for coupling the output of the audio driver to an external earpiece or headset to thereby allow the user to listen to the FM radio content via an earphone.

The controller 13, display element 11 and the speaker element 12 can be permanently affixed to or woven into a garment. Alternatively, they can be attached to the garment or to a person's body by any mechanism that allows them to be removed and reattached as desired, such as for example by a Velcro strap or clip. Any type of attachment mechanism can be used, the purpose being to secure the device in a way that allows the outputs from display element 11 and speaker element 12 to be perceived by others.

While the invention has been described in conjunction with the above embodiments, numerous alternatives, modifications, variations and uses will be apparent to those skilled in the art.

What is claimed is:

1. A sport-fan garment comprising:
a logo or other indicia of a sport team that is visible when the garment is worn,
a presentation element that emits a perceivable output, wherein said perceivable output includes a visible output and an audio output,
a garment output controller that controls the presentation element's emission of said perceivable output, and
a receiver for receiving a signal that is encoded with a team event message for the sport team whose logo or indicia appears on the garment,
wherein said garment output controller causes the presentation element to emit a perceivable output in response to said team event message.

2. The garment of claim 1 further comprising a security mechanism for detecting whether the received team event message is from an authorized source and wherein said controller causes said presentation element to emit said output only if said mechanism determines that the event message is authorized.

3. The sport-fan garment of claim 1 further comprising:
a team identifier that identifies said sport team to said garment output controller, and
a decoder for determining if the team event message relates to said team identified by said team identifier, wherein said garment output controller causes the presentation element to emit a perceivable output in response to a team event message only if the decoder determines that the team event message is related to said team identified by said team identifier.

4. The garment of claim 3 wherein said receiver receives said signal and said decoder decodes said received messages in a format and protocol used by a wide area RF broadcast transmitter that embeds said team event messages in RF transmissions that are capable of nearly simultaneously reaching a plurality of sport fan garments located over a region that spans a substantial portion of the geographic market for that sport team.

5. The garment of claim 4 wherein the received wide area RF broadcast transmission is a commercial RF broadcast that includes embedded data that represents team event messages.

6. The garment of claim 5 wherein the received wide area RF commercial broadcast transmission is an FM radio-data signal in accordance with the radio broadcast data standard, and wherein said decoder comprises an RDS decoder for extracting RDS data from the FM radio-data signal and determining whether said extracted RDS data includes a team event message directed to said sport team whose logo or indicia appears on said garment.

7. The garment of claim 4 further comprising a security mechanism for detecting whether the received team event message is from an authorized source and wherein said controller causes said presentation element to emit said output only if said mechanism determines that the event message is authorized.

8. The garment of claim 7 wherein said security mechanism comprises a cryptographic decoder.

9. The garment of claim 6 wherein the wide area RF broadcast receiver comprises an FM tuner and wherein said garment further comprises an output port coupled to an output of said FM tuner for providing an audio signal to a remote speaker element.

10. The garment of claim 1 wherein said presentation element includes a light emitting element and an audio transducer, and wherein said controller selects predetermined drive signals in response to said received team event message and drives the light emitting element and the audio transducer with the selected signals.

11. The garment of claim 10 wherein said controller comprises a memory for storing information representative of a plurality of audio/visual outputs and wherein said controller selects at least one of the audio/visual outputs corresponding to said received team event message for presentation by said light emitting element and said audio transducer.

12. The garment of claim 11 wherein said decoder determines, from said team event message, when said sport team identified by said identifier has scored, and in response, said controller selects a corresponding audio/visual output signal from said memory.

13. The garment of claim 1 wherein the garment is a cap bearing a team logo.

14. The garment of claim 1 wherein the garment is jersey bearing a team logo.

15. A sport-fan garment comprising:
- a logo or other indicia of a sport team that is visible when the garment is worn,
- a presentation element that emits a perceivable output, wherein said perceivable output includes a visible output and an audio output,
- a garment output controller that controls the presentation element's emission of said perceivable output, and
- a receiver for receiving a signal that is encoded with a team event message for the sport team whose logo or indicia appears on the garment, wherein said received signal is in a format and protocol used by a wide area RF broadcast transmitter that embeds said team event messages in RF transmissions that are capable of nearly simultaneously reaching a plurality of sport fan garments located over a region that spans a substantial portion of the geographic market for that sport team,
- a team identifier that identifies said sport team to said garment output controller, and
- a decoder for determining if the team event message relates to said team identified by said team identifier,
- wherein said garment output controller causes the presentation element to emit a perceivable output in response to a team event message only if the message is determined by said decoder to be related to said team identified by said team identify.

* * * * *